Figure 1:
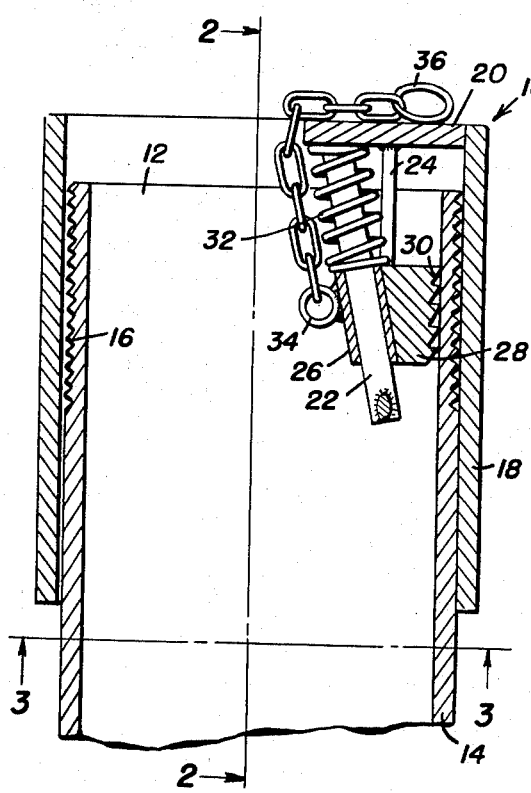

Aug. 9, 1955 — E. H. WILLIAMS — 2,714,900
PIPE THREAD PROTECTOR
Filed Jan. 28, 1952

Ellis H. Williams
INVENTOR.

United States Patent Office 2,714,900
Patented Aug. 9, 1955

2,714,900
PIPE THREAD PROTECTOR

Ellis H. Williams, Long Beach, Calif.

Application January 28, 1952, Serial No. 268,535

8 Claims. (Cl. 138—96)

This invention relates in general to pipe thread protectors, and more specifically to pipe thread protectors which are carried on the threaded ends of pipes for protecting the threads of same during shipment.

When large threaded pipes are shipped it is necessary that their threaded ends be provided with some sort of cap arrangement for protecting the threads against damage. If these caps were not provided, the threads on the ends of pipes would be damaged by engagement with other pipes during movement and it would be necessary to re-thread the ends of the pipes. While there are pipe thread protectors in existence, these thread protectors are either threaded onto the ends of the pipe or are jammed thereon. In the case of the thread protectors which are threadedly engaged on the ends of the pipes, they are oftentimes difficult to remove in that they become rusted thereon. The thread protectors which are jammed onto the ends of the pipes need to be pried off with the result that the threads are often damaged in the removing of the thread protector. In the case of large oil well casings, it is obvious that it is desired to have a thread protector which need be removed only just prior to the assembling of two sections of pipe. When the conventional type of thread protector is attempted to be removed from the oil well casing when it is in a vertical position, it will be quite difficult to remove the protector if it is stuck on the pipe as mentioned above. Furthermore, the threaded type of protector often is cross-threaded on the ends of the pipes and results in costly delays in the construction of oil wells.

The primary object of this invention is to provide an improved pipe thread protector which is slidably engaged over the threaded end of the pipe and easily removed therefrom.

Another object of this invention is to provide an improved pipe thread protector which is in the form of a sleeve adapted to be slidably engaged over the threaded end of a pipe, said sleeve having a wedge mounted thereon for engaging the inner wall of a pipe to retain the sleeve thereon.

Another object of this invention is to provide an improved pipe thread protector having clamping means for retaining the same on the end of a pipe, said thread protector loosely fitting over the end of the pipe whereby when said clamping means is released the thread protector will fall off if the pipe is in a vertical position.

Another object of this invention is to provide an improved pipe thread protector which is substantially free of parts subject to wear, whereby it may be used a plurality of times.

Another object of this invention is to provide an improved pipe thread protector of simple and compact construction whereby it may be economically manufactured.

A further object of this invention is to provide an improved pipe thread protector which is automatically clamped to the end of a pipe to which it is attached.

Figure 2:
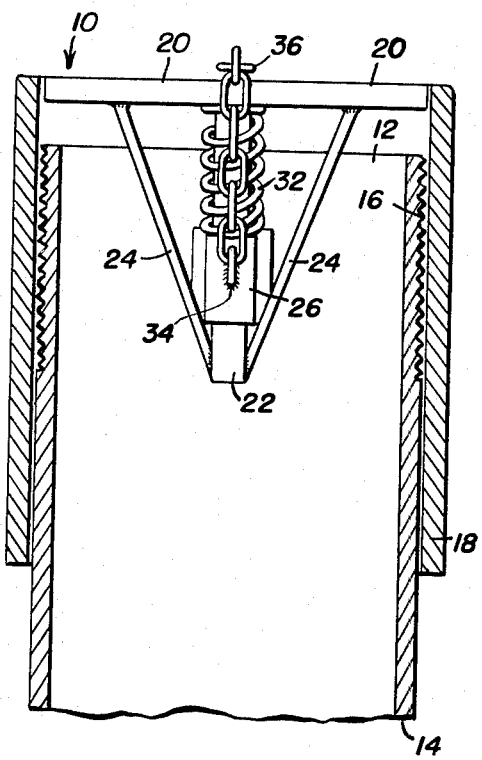
Figure 3:
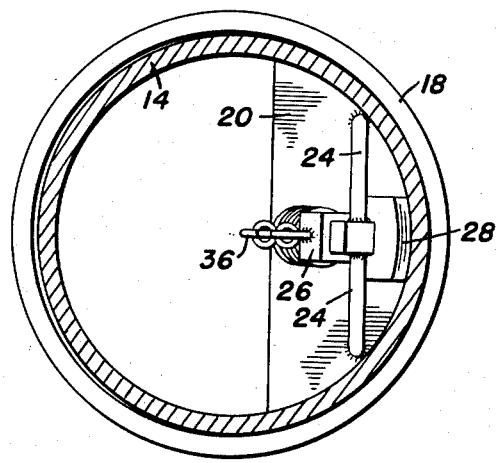

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a transverse vertical sectional view through the threaded end of a pipe and showing the improved pipe thread protector, which is the subject of this invention, retained on and protecting the threaded end thereof;

Figure 2 is a transverse vertical sectional view taken substantially upon the plane indicated by the section line 2—2 of Figure 1 and showing the arrangement of the clamping elements for retaining the pipe thread protector on the end of the pipe; and Figure 3 is a horizontal sectional view taken substantially upon the plane indicated by the section line 3—3 of Figure 1 and showing the arrangement of the clamping elements of the pipe thread protector as viewed from the interior of the pipe on which the protector is mounted.

Similar characters of references designate similar or identical elements and portions throughout the specification and throughout the different views of the drawings.

Referring now to the drawings in detail, it will be seen that the pipe thread protector, which is the subject of this invention, is referred to generally by the reference numeral 10 and is illustrated as being mounted on the threaded end 12 of a section of pipe 14. As is clearly illustrated in Figures 1 and 2, the threaded end 12 of the pipe section 14 has threads 16 on its exterior.

The pipe thread protector 10 includes a cylindrical sleeve 18 which is opened at its lower end and provided with a plate 20 at its upper end which is welded thereto and partially closes the upper end of the sleeve 18. Secured to the underside of the plate 20 adjacent its free end is a downwardly and outwardly extending guide rod 22. As is best illustrated in Figure 2, the lower end of the guide rod 22 is braced by a pair of diagonal braces 24 which are secured at their upper ends to the underside of the plate 20 and at their lower end to the end of the guide rod 22. The braces 24 lie in a common vertical plane and form a V thereon.

The guide rod 22 is preferably square in cross-section and has a sleeve 26 slidably mounted thereon. Carried by the sleeve and integral therewith is a wedge element 28 having a serrated face 30 on the side opposite from the sleeve 26. It will be noted that the sleeve is also square so as to position the serrated face 30 of the wedge 28 on the outer side of the guide rod 22.

Also mounted on the guide rod 22 is a compression coil spring 32 which is disposed between the under surface of the plate 20 and the upper edge of the sleeve 26. As is best illustrated in Figure 1, the sleeve 18 loosely slides over the threaded end 12 of the pipe 14 and the serrated face 30 of the wedge 28 engages the inner wall of the pipe section 14. The wedge 28 is forced downwardly into tight engagement with the inner wall of the pipe section 14 by the coil compression spring 32. Due to the downwardly and outwardly sloping of the guide rod 22, it is obvious that if the sleeve 18 is moved towards the end of the pipe section 14, the wedge 28 and its associated sleeve 26 will attempt to move downwardly on the guide rod 22 and thereby more tightly jam against the inner wall of the pipe section 14. Furthermore, the serrations have points which face outwardly, as viewed in Figure 1, so as to prevent movement of the wedge 28 upwardly with respect to the pipe section 14.

In order that the wedge 28 may be released from the inner wall of the pipe section 14, the sleeve 26 is provided with an integral ring 34 to which is attached a length of chain 36. When it is desired to remove the thread protector 10 from the threaded end 12 of the pipe section 14, the chain 36 is pulled upwardly, as viewed in Figure 1, thereby urging the sleeve 26 and its associated wedge 28 upwardly against the coil compression spring 32. The serrated face of the wedge 28 being disengaged from the inner wall of the pipe section 14, the entire pipe thread protector 10 is usually moved upwardly and off the end of the pipe.

It will be understood that while the pipe thread protector 10 illustrated in the drawings is limited to one size of pipe only, that other pipe thread protectors may be made for any specific diameter of pipe.

When the pipe thread protector, which is the subject of this invention, is utilized on the ends of sections of an oil well casing, it is obvious that the sections of casing may be hoisted into a vertical position by the drilling rig, and the pipe thread protector removed just prior to the connection of the casing to a section of casing already in the well. While the section of casing or pipe is held in a vertical position, the lower thread protector may be removed by merely pulling downwardly on its wedge releasing chain with the result that the wedge is moved downwardly out of engagement with the inner wall of the casing and the thread protector falls off of the section of casing.

The operation of this thread protector will be understood from the foregoing description of the mechanical details thereof, taken in connection with the above recited objects and the drawings. Further description would appear to be unnecessary.

Minor modifications of the thread protector, varying in minor details from the embodiment of the thread protector illustrated and described here, may be resorted to without departure from the spirit and scope of this invention, as defined in the appended claims.

Having described the invention, what is claimed as new is:

1. A pipe thread protector including: a sleeve capable of slidably engaging the exterior surface of a pipe; a transversely disposed plate affixed to said sleeve, said sleeve being of such length as to envelope the threads of a pipe when said sleeve is disposed on one end portion thereof; an angularly disposed guide rod of non-annular cross section that extends inwardly into said sleeve from said plate; a pipe-engaging element having a bore extending therethrough at substantially the same angle as said guide rod, said bore being of substantially the same non-annular cross section as said rod but of slightly larger area to permit said element to be slidably mounted on said rod, said element having an outwardly disposed face substantially parallel to the interior face of said sleeve when said element is moved on said rod; two braces extending outwardly from opposite sides of the inwardly disposed end portion of said rod, said outwardly disposed ends of said braces being rigidly affixed to said plate, and serving to reinforce said guide rod and act as a stop to limit the inward movement of said engaging element; a helical compressed spring encircling said guide rod, the outer end of said spring abutting against said plate, and the inner end of said spring abutting against said element; a plurality of serrations formed on said outwardly disposed face, said serrations being of such configuration as to be slidable on the interior surface of said pipe when subjected to inward motion, but not slidable on said interior surface when an outwardly directed force is applied to said sleeve.

2. A pipe thread protector including: a sleeve capable of slidably engaging the exterior surface of a pipe; a transversely disposed plate extending across one end portion of said sleeve; an angularly disposed guide rod of non-annular cross section that extends into said sleeve from said plate; a pipe-engaging element having a bore extending therethrough at substantailly the same angle as said guide rod, said bore being of substantially the same non-annular cross section as said rod but of slightly larger area to permit said element to be slidably mounted on said rod, said element having an outwardly disposed face substantially parallel to the interior face of said sleeve when said element is moved on said rod; a stop rigidly affixed to said guide rod to limit the inward movement of said engaging member; compressed spring means disposed between said plate and element that at all times urge said element inwardly; a plurality of serrations formed on said outwardly disposed face, said serrations being of such configuration as to be slidable on the interior surface of said pipe when subjected to inward motion, but not slidable on said interior surface when an outwardly directed force is applied to said sleeve; and manually engageable means affixed to said element that may be grasped to pull said element outwardly to a non-engaging position.

3. A pipe thread protector including: a sleeve capable of slidably engaging the exterior surface of a pipe; a plate mounted on one end portion of said sleeve; an angularly disposed guide rod of non-annular cross section extending into said sleeve from said plate; a pipe-engaging element having a bore extending therethrough at substantially the same angle as said guide rod, said bore being of substantially the same non-annular cross section as said rod but of slightly larger area to permit said element to be slidably mounted on said rod, and said element having an outwardly disposed face substantially parallel to the interior face of said sleeve when said element is moved on said rod; a stop operatively associated with said guide rod to limit the inward movement of said engaging member; compressed spring means disposed between said plate and element that at all times urge said element inwardly; a plurality of serrations formed on said outwardly disposed face, said serrations being of such configuration as to be slidable on the interior surface of said pipe when subjected to inward motion, but not slidable on said interior surface when an outwardly directed force is applied to said sleeve; and flexible manually engageable means affixed to said element which when pulled outwardly moves said element to a non-engaging position.

4. A pipe thread protector including: a sleeve capable of slidably engaging the exterior surface of a pipe; a transversely disposed plate mounted on one end portion of said sleeve; an angularly disposed guide rod of non-annular cross section extending into said sleeve from said plate; a pipe-engaging element slidably mounted on said guide rod that has an outer face which is at all times substantially parallel to the interior face of said sleeve; means to limit the inward movement of said element on said guide rod; compressed spring means disposed between said plate and element that urge said element inwardly; a plurality of serrations formed on said outwardly disposed face, said serrations being of such configuration as to be slidable on the interior surface of said pipe when subjected to inward motion, but not slidable on said interior surface when an outwardly directed force is applied to said sleeve; and manually engageable means for moving said element out of an engaging position.

5. A self locking pipe thread protector including: a sleeve capable of slidably engaging the exterior surface of a pipe; a transversely disposed plate extending across one end portion of said sleeve; a pipe-engaging element; means that movably support said pipe-engaging element from said plate so that said element as it moves inwardly relative to said sleeve also moves laterally until it engages said pipe; spring means that at all times tend to maintain said element in a pipe-engaging position; and manually engageable means connected to said element which when pulled outwardly move said element to a non-engaging position.

6. A self locking pipe thread protector including: a sleeve capable of slidably engaging the exterior surface of a pipe; a pipe-engaging element; guide means that movably support said pipe-engaging element within the confines of said sleeve so that said element as it moves inwardly in said sleeve also moves laterally until it engages the interior surface of a pipe; spring means that automatically move said element to a pipe-engaging position upon said sleeve being slidably mounted on one end of a pipe; and manually engageable means affixed to said element which when pulled outwardly move said element out of an engaging position.

7. A self locking pipe thread protector including: a sleeve capable of slidably engaging the exterior surface of a pipe; a pipe-engaging element; means that movably support said pipe-engaging element within the confines of said sleeve so that said element as it moves inwardly in said sleeve also moves laterally until it engages the interior surface of said pipe; spring means that automatically move said element to a pipe-engaging position when said sleeve is slidably mounted on one end of said pipe.

8. A self locking pipe thread protector including: a sleeve capable of slidably engaging the exterior surface of a pipe; a pipe-engaging element; means that movably support said pipe-engaging element within the confines of said shell so that said element as it moves inwardly relative to said sleeve, also moves laterally until it engages said pipe; spring means that automatically move said element to a pipe-engaging position when said sleeve is slid onto one end of a pipe; and manually engageable means affixed to said element which when pulled outwardly move said element out of an engaging position.

References Cited in the file of this patent

UNITED STATES PATENTS

| | | |
|---|---|---|
| 622,376 | Lieber | Apr. 4, 1899 |
| 2,168,734 | Freeman | Aug. 8, 1939 |
| 2,226,233 | Shapiro | Dec. 24, 1940 |
| 2,269,198 | Hicks | Jan. 6, 1942 |
| 2,547,992 | Baker | Apr. 10, 1951 |